(12) United States Patent
Liu et al.

(10) Patent No.: US 11,393,140 B2
(45) Date of Patent: Jul. 19, 2022

(54) METHOD AND SYSTEM FOR GENERATING IMAGERY MAPPING MODELING OF GOBLET

(71) Applicant: CHINA ACADEMY OF ART, Hangzhou (CN)

(72) Inventors: Zheng Liu, Hangzhou (CN); Yun Wang, Hangzhou (CN); Guosheng Hu, Hangzhou (CN); Ming Shao, Hangzhou (CN); Hongdou Wang, Hangzhou (CN)

(73) Assignee: CHINA ACADEMY OF ART, Hangzhou (CN)

( * ) Notice: Subject to any disclaimer, the term of this patent is extended or adjusted under 35 U.S.C. 154(b) by 301 days.

(21) Appl. No.: 16/862,597

(22) Filed: Apr. 30, 2020

(65) Prior Publication Data

US 2020/0349747 A1   Nov. 5, 2020

(30) Foreign Application Priority Data

Apr. 30, 2019 (CN) .......................... 201910362662.6

(51) Int. Cl.
*G06T 11/20* (2006.01)
*G06T 7/13* (2017.01)
*G06F 30/10* (2020.01)

(52) U.S. Cl.
CPC ............ *G06T 11/203* (2013.01); *G06F 30/10* (2020.01); *G06T 7/13* (2017.01); *G06T 2207/20156* (2013.01)

(58) Field of Classification Search
CPC ..................... G06T 11/203; G06T 7/13; G06T 2207/20156; G06F 30/10
See application file for complete search history.

(56) References Cited

U.S. PATENT DOCUMENTS 9,280,560 B1 *   3/2016  Dube ................... G06K 9/6269
10,664,722 B1 *  5/2020  Sharma ................. G06V 20/00
(Continued)

FOREIGN PATENT DOCUMENTS

WO   WO-2010025539 A1 *  3/2010  ........... G01F 23/288
WO   WO-2017073520 A1 *  5/2017  ............... G06T 7/00

OTHER PUBLICATIONS

Kang et al.; "Image Matching with Distinctive Visual Vocabulary;" IEEE Proceedings 2010 (Year: 2010).*

*Primary Examiner* — David T Welch
(74) *Attorney, Agent, or Firm* — Bayramoglu Law Offices LLC

(57) ABSTRACT

A method and a system for generating imagery mapping modeling of goblet. The method includes: pre-process collected goblets based on a height of each goblet, and establish a sample library of goblet modeling features; perform dimension reduction processing on the imagery vocabulary, and establish a goblet user imagery adjective pair based on the processing result; a relationship between the goblet modeling and imagery adjective is obtained through the sample library of goblet modeling features and the goblet user imagery adjective pair, and an optimal imagery value is established; input an user-entered imagery value into to the established optimal goblet imagery mapping modeling model, and produces a goblet shape meets an index. It realize users' demand for imagery modeling for the goblet and provide a fast and effective new idea for updating and iterating the goblet modeling scheme with a genetic algorithm and a computer programming technology.

9 Claims, 4 Drawing Sheets

(56) References Cited

U.S. PATENT DOCUMENTS

| | | | |
|---|---|---|---|
| 2014/0304122 A1* | 10/2014 | Rhoads | G06Q 30/0643 |
| | | | 705/27.2 |
| 2015/0016712 A1* | 1/2015 | Rhoads | H04N 7/185 |
| | | | 707/769 |
| 2016/0048536 A1* | 2/2016 | Di | G06V 10/751 |
| | | | 382/165 |
| 2017/0154204 A1* | 6/2017 | Ryu | G06V 10/462 |

* cited by examiner ized consumer demand, companies will inevitably need to address how accurately and efficiently get the critical issue of the individual needs of users.

METHOD AND SYSTEM FOR GENERATING IMAGERY MAPPING MODELING OF GOBLET

CROSS-REFERENCE TO RELATED APPLICATIONS

This Non-provisional application claims priority under 35 U.S.C. § 119(a) on Chinese Patent Application No(s). CN201910362662.6 filed on Apr. 30, 2019, the entire contents of which are hereby incorporated by reference.

BACKGROUND OF THE INVENTION

Field of the Invention

The invention relates to a technical field of computer-aided, in particular to a method and a system for generating imagery mapping modeling of goblet.

Description of the Related Art

In the goblet industry, annual sales are increasing year by year. The industry demand for goblet has reached the highest in recent years. In China, due to the economic improvement and the increase in national consumption, the demand for goblet is also increasing, and the requirements are becoming higher and higher. As a product with a single function and a single environment, the quality of the goblet has a huge impact on its sales. Therefore, studying the shape of the goblet can inspire the designer to design a goblet shape that is more in line with the user's image, which has a significant impact on the goblet industry.

With the increasing homogeneity of functions and technologies, the design of the goblet has gradually become a decisive factor influencing consumer decision-making. Various goblet brand manufacturers are also shaping their brand imagery through product modeling empowerment; making products Appearance design has certain competitiveness and innovation.

The process of globalization brought about by the fierce market competition, forcing companies to continue to seek innovative products to improve market competitiveness, so as to win the survival and development in the fierce market competition. Modern design theory, product innovation and design should be user-centered. With the increasingly rich social product categories and improve the quality of life, user demand for products showing a personalized, diversified characteristics. To meet the diversified consumer demand, companies will inevitably need to address how accurately and efficiently get the critical issue of the individual needs of users.

The emergence of computer-aided design has brought great changes to the work of designers, which has greatly alleviated the shortcomings of traditional manual drawing design, such as large labor and low innovation efficiency. The computer-aided design results can be used to generate new product modeling solutions through the computer, providing designers with a variety of solutions for reference, greatly improving the efficiency and output of designers. However, how to accurately obtain user images and their derived models is a difficult point in the study of perceptual engineering.

However, the existing computer-aided design scheme generation system has the following disadvantages:

Due to the large number of product bases and different design methods of product modeling schemes, the curve modeling and component modeling are different;

At present, there are relatively few studies on the curve modeling of tall glasses, and it is difficult to obtain points, and no unified requirements have been reached;

At present, the design of curvilinear products is generally dominated by industrial designers. It is carried out with personal subjective aesthetics and experience, and lacks computer support. At the same time, because consumers have different needs, designers cannot fully understand the needs of consumers. However, there is no effort to tailor it to consumers, and this problem has always plagued modern industrial design.

In general, it is because there has not been a relatively uniform generation method, which has led to less research on goblet.

BRIEF SUMMARY OF THE INVENTION

In view of the shortcomings in the prior art, the present invention provides a method and a system for generating imagery mapping modeling of goblet.

In order to solve the above technical problems, the present invention is solved by the following technical solutions:

A method for generating an imagery mapping modeling of a goblet includes the following steps:

based on all collected goblets, pre-process the collected goblets based on a height of each goblet, and establish a sample library of goblet modeling features;

based on a collected goblet imagery vocabulary, perform dimension reduction processing on the imagery vocabulary, and establish a goblet user imagery adjective pair based on the processing result;

a relationship between the goblet modeling and imagery adjective is obtained through the sample library of goblet modeling features and the goblet user imagery adjective pair, and an optimal imagery value is established. The imagery mapping modeling model corresponding to the optimal imagery value is an optimal goblet imagery mapping modeling model;

input a user-entered imagery value into to the established optimal goblet imagery mapping modeling model, and produces a goblet shape meets an index.

As an optional embodiment, the pre-process the collected goblets based on a height of each goblet, and establish a sample library of goblet modeling features, as described in the following steps:

select typical samples from the collected goblets;

a uniformity of the goblet height is performed on all the selected typical samples to obtain goblet samples of uniform height;

extract an outline of the goblet samples of the uniform height to obtain an outline curve of a side of the goblet;

the outline curve of the side of the goblet is modeled and coded, and the Bezier curve is used to perform a drawing point expression process of the outline curve of the side of each goblet to obtain a drawing point coordinate of the side outline of the goblet;

according to the drawing point coordinate of the side outline of the goblet, the coordinate value variable of the outline curve of the side of the goblet is obtained, and then the sample library of goblet modeling features of the goblet is obtained.

As an optional embodiment, extract an outline of the goblet samples of the uniform height to obtain an outline curve of a side of the goblet, as described in the following steps:

draw the outline of the goblet into the Bezier curve, and leave a goblet stem width and base untreated;

draw several coordinate points on the Bezier curve, and plot these several coordinate points to obtain the outline curve of the side of the goblet.

As an optional embodiment, perform dimension reduction processing on the imagery vocabulary based on a collected goblet imagery vocabulary, and establish a goblet user imagery adjective pair based on the processing result, as described in the following steps:

collect all the words about an imagery of the goblet to form an imagery vocabulary;

perform dimension reduction processing on the imagery vocabulary to obtain the goblet user imagery adjective pair.

As an optional embodiment, a relationship between the goblet modeling and imagery adjective is obtained through the sample library of goblet modeling features and the goblet user imagery adjective pair, and an optimal imagery value is established. The imagery mapping modeling model corresponding to the optimal imagery value is an optimal goblet imagery mapping modeling model, as described in the following steps:

take a typical sample seed in the sample library of goblet modeling features as an initial value, and perform binary coding on the coordinate value of the outline curve of the side of the typical sample seed;

obtain a user's score on the imagery adjective of the goblet, and obtain a relationship between the sample library of goblet modeling features and the imagery adjective;

based on a crossing rate parameter of a genetic algorithm, two seeds are selected from the sample library of goblet modeling features, and a gene position was randomly selected for cross-genetic generation of candidate seeds for treatment. Candidate seeds after treating are put back into a seed pool, namely the sample library of goblet modeling features;

traverse the entire seed pool, select a corresponding seed according to a mutation rate parameter, randomly select a mutation position based a gene of the corresponding seed, and perform mutation operation processing on the gene at the mutation position;

obtain a Euclidean distance between each candidate seed from the typical sample seed, and convert the Euclidean distance into a weight value;

calculate the imagery value of the current seed in the seed pool and compare the imagery value with the imagery value of the typical sample seed to obtain a fitness of the seed. Select a maximum fitness value and save a most suitable seed to obtain a most suitable seed per generation, and use a seed with the highest fitness value as the final solution;

the imagery values of all the seeds in the seed pool were multiplied and the weight values were added to obtain a final imagery value, resulting in the optimal imagery mapping modeling of goblet.

A system for generating imagery mapping modeling of goblet includes a sample features library establishment module, an adjective pair establishment module, a model establishment module and a result acquisition module.

The sample features library establishment module for all the collected goblets pre-process the collected goblets and establish a sample library of goblet modeling features based on a height of the goblets.

The adjective pair establishment module is used to perform dimension reduction processing on the imagery vocabulary based on the collected goblet imagery vocabulary, and to establish the goblet user imagery adjective pair based on the processing result;

The model establishment module is used to obtain a relationship between the goblet modeling and imagery adjective through the sample library of goblet modeling features and the goblet user imagery adjective pair, and an optimal imagery value is established. The imagery mapping modeling model corresponding to the optimal imagery value is an optimal goblet imagery mapping modeling model.

The result acquisition module is configured to input a user-entered imagery value into to the established optimal goblet imagery mapping modeling model, and produces a goblet shape meets an index.

As an optional embodiment, the sample features library establishment module is configured as follows:

select typical samples from the collected goblets;

a uniformity of the goblet height is performed on all the selected typical samples to obtain goblet samples of uniform height;

extract an outline of the goblet samples of the uniform height to obtain an outline curve of a side of the goblet;

the outline curve of the side of the goblet is modeled and coded, and the Bezier curve is used to perform a drawing point expression process of the outline curve of the side of each goblet to obtain a drawing point coordinate of the side outline of the goblet;

according to the drawing point coordinate of the side outline of the goblet, the coordinate value variable of the outline curve of the side of the goblet is obtained, and then the sample library of goblet modeling features of the goblet is obtained.

As an embodiment, the sample features library establishment module is configured as follows:

draw the outline of the goblet into the Bezier curve, and leave a goblet stem width and base untreated;

draw several coordinate points on the Bezier curve, and plot these several coordinate points to obtain the outline curve of the side of the goblet.

As an embodiment, the adjective pair establishment module is set as:

collect all the words about an imagery of the goblet to form an imagery vocabulary;

perform dimension reduction processing on the imagery vocabulary to obtain the goblet user imagery adjective pair.

As an optional embodiment, the model establishment module is configured as:

take a typical sample seed in the sample library of goblet modeling features as an initial value, and perform binary coding on the coordinate value of the outline curve of the side of the typical sample seed;

obtain a user's score on the imagery adjective of the goblet, and obtain a relationship between the sample library of goblet modeling features and the imagery adjective;

based on a crossing rate parameter of a genetic algorithm, two seeds are selected from the sample library of goblet modeling features, and a gene position was randomly selected for cross-genetic generation of candidate seeds for treatment. Candidate seeds after treating are put back into a seed pool, namely the sample library of goblet modeling features;

traverse the entire seed pool, select a corresponding seed according to a mutation rate parameter, randomly select a mutation position based a gene of the corresponding seed, and perform mutation operation processing on the gene at the mutation position;

obtain a Euclidean distance between each candidate seed from the typical sample seed, and convert the Euclidean distance into a weight value;

calculate the imagery value of the current seed in the seed pool and compare the imagery value with the imagery value of the typical sample seed to obtain a fitness of the seed. Select a maximum fitness value and save a most suitable seed to obtain a most suitable seed per generation, and use a seed with the highest fitness value as the final solution;

the imagery values of all the seeds in the seed pool were multiplied and the weight values were added to obtain a final imagery value, resulting in the optimal imagery mapping modeling of goblet.

The present invention has significant technical effects due to the adoption of the above-mentioned technological schemes.

The invention proposes a computer-aided scheme generation method for product of such curved shape as goblet, and generates goblet shape satisfying each imagery value index according to the imagery value entered by the user. The relationship between the goblet modeling and imagery adjective is established to realize the user's demand for the imagery modeling of goblet. Combined with the genetic algorithm, the computer programming technology provides a fast and effective new idea for the update and iteration of goblet modeling scheme, provides an effective method for product innovation, and provides constructive guidance for enterprises to carry out goblet modeling design.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely these are some embodiments of the present invention. For those of ordinary skill in the art, other drawings can be obtained based on these drawings without paying creative labor.

DETAILED DESCRIPTION OF THE INVENTION

The invention is further described in detail in combination with the following embodiments, the following embodiments are explanations of the invention and the invention is not limited to the following embodiments.

Embodiment One

Figure 1:
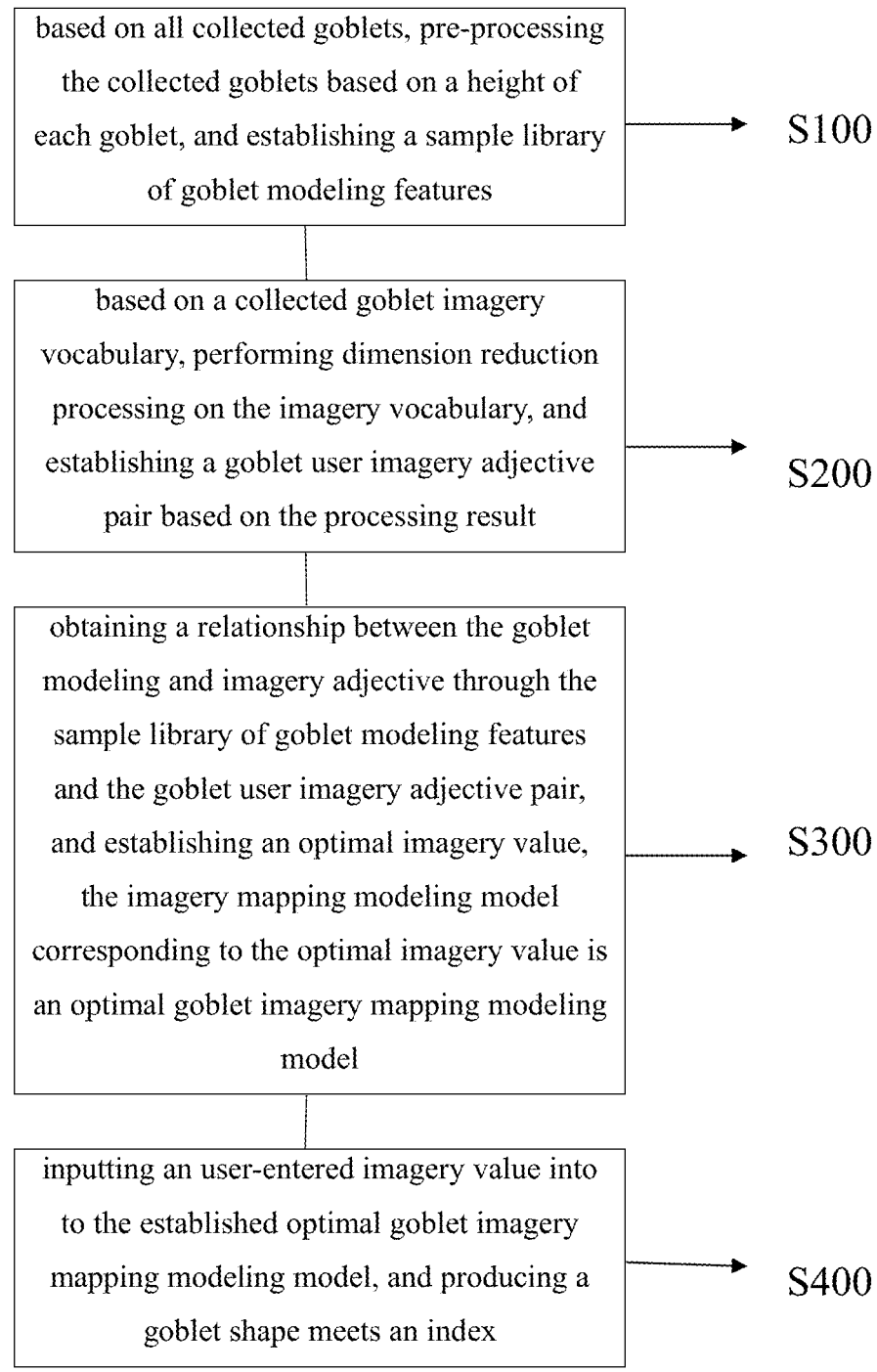
FIG. 1 is a schematic diagram of an overall process of the present invention.

A method for generating an imagery mapping modeling of a goblet, as shown in FIG. 1, includes the following steps:

S100: Based on all collected goblets, pre-process the collected goblets based on a height of each goblet, and establish a sample library of goblet modeling features;

S200: Based on a collected goblet imagery vocabulary, perform dimension reduction processing on the imagery vocabulary, and establish a goblet user imagery adjective pair based on the processing result;

S300: a relationship between the goblet modeling and imagery adjective is obtained through the sample library of goblet modeling features and the goblet user imagery adjective pair, and an optimal imagery value is established. The imagery mapping modeling model corresponding to the optimal imagery value is an optimal goblet imagery mapping modeling model;

S400: Input a user-entered imagery value into to the established optimal goblet imagery mapping modeling model, and produces a goblet shape meets an index.

In this embodiment, the bottom case library of the goblets is collected according to the brand, and the most popular goblets in the market are collected through the Internet, magazines and other channels, including Lucaris in Japan, RIEDEL in Austria, Baccarat & Lalique in France, Spiegelau, Stolzle, SCHOTT in German and other 7 brands, and a total of 333 bottom cases are collected. The goblets are divided into three major types: external expansion type, external expansion type with a closed mouth and closed mouth type. There are about 13 types. Pick one case for each type, and you can get a typical case of a modern goblet.

In step S100, pre-process the collected goblets based on a height of each goblet, and establish a sample library of goblet modeling features, as described in the following steps:

S110: select typical samples from the collected goblets;

S120: a uniformity of the goblet height is performed on all the selected typical samples to obtain goblet samples of uniform height;

S130: extract an outline of the goblet samples of the uniform height to obtain an outline curve of a side of the goblet;

S140: the outline curve of the side of the goblet is modeled and coded, and the Bezier curve is used to perform a drawing point expression process of the outline curve of the side of each goblet to obtain a drawing point coordinate of the side outline of the goblet;

S150: according to the drawing point coordinate of the side outline of the goblet, the coordinate value variable of the outline curve of the side of the goblet is obtained, and then the sample library of goblet modeling features of the goblet is obtained.

This step is the process of pre-processing the collected goblets, after which the sample library of goblet modeling features of the goblet can be obtained.

In step S130, extract an outline of the goblet samples of the uniform height to obtain an outline curve of a side of the goblet, as described in the following steps:

S131: draw the outline of the goblet into the Bezier curve, and leave a goblet stem width and base untreated;

S132: draw several coordinate points on the Bezier curve, and plot these several coordinate points to obtain the outline curve of the side of the goblet.

Figure 5:
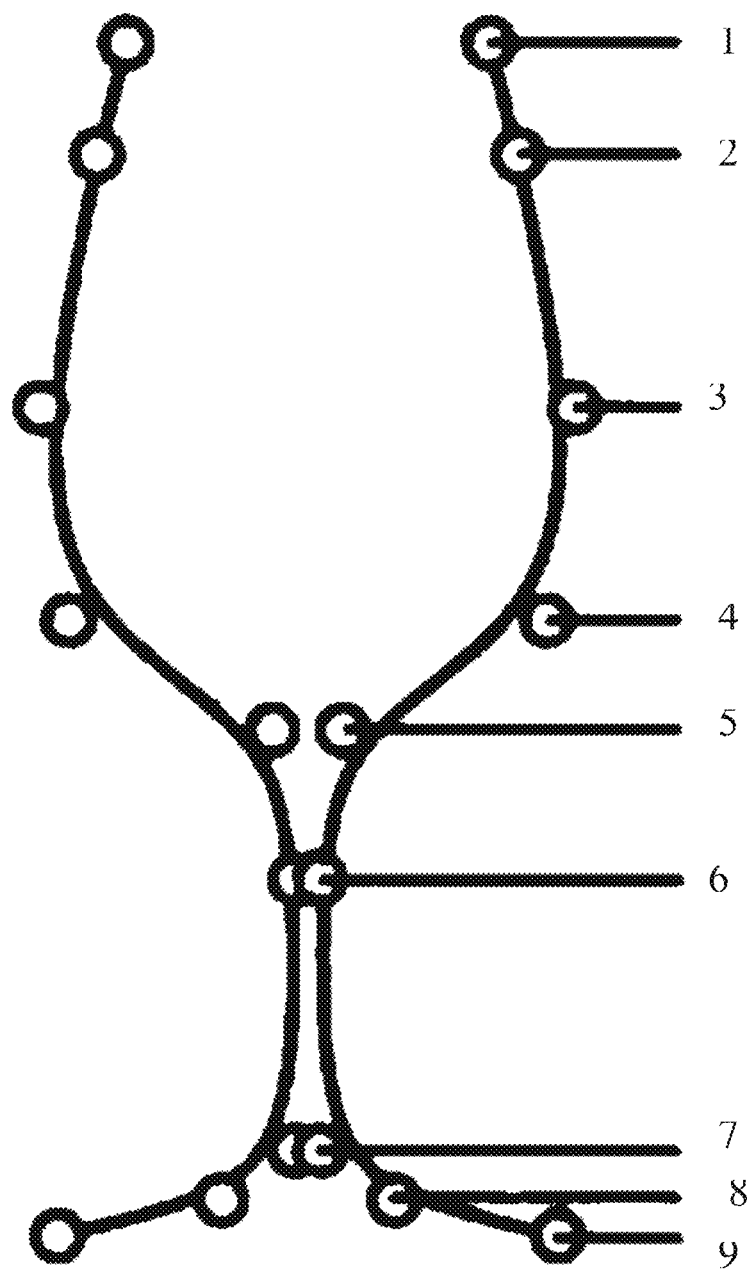
FIG. 5 is a coordinate point of an outline curve of a side of a goblet in this invention.

In the quantification of the shape curve of the goblet, generally, the Bezier curve is used to design the outline of goblet. The modeling of the goblet belly varies greatly. Some shapes can be expressed by 2 points, while some shapes need 4 points to complete the representation. Considering the running speed of the computer during the genetic algorithm calculation and similarity analysis in the later stage, the goblet base part and the width of the goblet stem are quantified here, only the shape of the goblet belly and the height of the goblet stem are allowed to change. In order to ensure the accuracy of the Bessel curve in expressing the shape of the goblet, the experiment shows that 9 coordinate points are used to express the shape of the goblet, in which the width points of the goblet stem and base remain unchanged. In order to extract and express the outline of the goblet, quantify the side outline of the goblet, and conduct a comparative analysis at the same time, composed of a smooth Bezier curve, and the overall height of 13 typical goblets is set to 1000. The width of the goblet stem and the base have a small influence on the shape of the goblet, so they are not changed. The vertical coordinates of points 6 and 1 are unchanged, and the horizontal and vertical coordinates of points 7, 8, and 9 are unchanged. In this way, the variables are the horizontal coordinate of point 1, the horizontal coordinates of points 2, 3, 4, 5 and the horizontal coordinate of point 6. There are 9 variables in total. The coordinates of the 9 points of the goblet can be obtained in the related drawing software. The side curves of the goblets were also modeled and coded to express their side contours using the Bezier curve, as shown in FIG. 5.

Furthermore, in step S200, perform dimension reduction processing on the imagery vocabulary based on a collected goblet imagery vocabulary, and establish a goblet user imagery adjective pair based on the processing result, as described in the following steps:

S210: collect all the words about an imagery of the goblet to form an imagery vocabulary;

S220: perform dimension reduction processing on the imagery vocabulary to obtain the goblet user imagery adjective pair.

To the embodiment of user imagery adjective to collect mainly by collecting from 1998 to 2017 in 10 years goblet or other container class imagery modeling case paper, on the network search goblet related words, and industrial design approaches are collected, such as preliminary to 96 adjectives tall imagery collection, and classify them. After filtering out words with similar meanings and unrepresentative words, 69 imagery adjectives were obtained. In addition, 69 imagery adjectives were examined and screened. Some of the adjectives that are not professionally described as perceptually expressive and that have repetitive adjectives with ambiguous meanings were eliminated, and 22 basic pairs that met the criteria of user imagery adjectives were retained, as shown in Table 1.

TABLE 1

| Initial user imagery adjective pairs | |
|---|---|
| NO. | Pairs of imagery adjectives |
| $S_1$ | Individuality--normal |
| $S_2$ | Lively-Composed |
| $S_3$ | Elegant-Vulgar |
| $S_4$ | Feminine-Masculine |
| $S_5$ | Lightweight-Heavy |
| $S_6$ | Individuality-Normal |
| $S_7$ | Lively-Composed |
| $S_8$ | Good-Bad |
| $S_9$ | Cold-Hot |
| $S_{10}$ | Nervous-Relaxed |
| $S_{11}$ | Rough-Smooth |
| $S_{12}$ | Dynamic-Stationary |
| $S_{13}$ | Round-Sharp |
| $S_{14}$ | Compact-Atmospheric |
| $S_{15}$ | Plain-Ornate |
| $S_{16}$ | Euphemistic-Bold |
| $S_{17}$ | Feminine-Masculine |
| $S_{18}$ | Elegant-Vulgar |
| $S_{19}$ | Small-Big |
| $S_{20}$ | Fresh-Stale |

TABLE 1-continued

| Initial user imagery adjective pairs | |
|---|---|
| NO. | Pairs of imagery adjectives |
| $S_{21}$ | Active-Passive |
| $S_{22}$ | Angular-Rounded |

Dimension reduction is performed on the imagery vocabulary to obtain the goblet user imagery adjective pair, as shown in Table 2.

TABLE 2

| User imagery adjective pair | |
|---|---|
| NO. | User imagery adjectives |
| D1 | compact-generous |
| D2 | Public-individual |
| D3 | tough-gentle |
| D4 | modern-classic |
| D5 | simple-cumbersome |

Serial User Imagery Adjectives D1, D2, D3, D4, D5.

In step S300, a relationship between the goblet modeling and imagery adjective is obtained through the sample library of goblet modeling features and the goblet user imagery adjective pair, and an optimal imagery value is established. The imagery mapping modeling model corresponding to the optimal imagery value is an optimal goblet imagery mapping modeling model, as described in the following steps:

S310: take a typical sample seed in the sample library of goblet modeling features as an initial value, and perform binary coding on the coordinate value of the outline curve of the side of the typical sample seed;

S320: obtain a user's score on the imagery adjective of the goblet, and obtain a relationship between the sample library of goblet modeling features and the imagery adjective;

S330: based on a crossing rate parameter of a genetic algorithm, two seeds are selected from the sample library of goblet modeling features, and a gene position was randomly selected for cross-genetic generation of candidate seeds for treatment. Candidate seeds after treating are put back into a seed pool, namely the sample library of goblet modeling features;

S340: traverse the entire seed pool, select a corresponding seed according to a mutation rate parameter, randomly select a mutation position based a gene of the corresponding seed, and perform mutation operation processing on the gene at the mutation position;

S350: obtain a Euclidean distance between each candidate seed from the typical sample seed, and convert the Euclidean distance into a weight value;

S360: calculate the imagery value of the current seed in the seed pool and compare the imagery value with the imagery value of the typical sample seed to obtain a fitness of the seed. Select a maximum fitness value and save a most suitable seed to obtain a most suitable seed per generation, and use a seed with the highest fitness value as the final solution;

S370: the imagery values of all the seeds in the seed pool were multiplied and the weight values were added to obtain a final imagery value, resulting in the optimal imagery mapping modeling of goblet.

In step S350, the weight value can be added to the fitness calculation to obtain a goblet imagery mapping modeling regression function, so that the goblet imagery mapping modeling model is more accurate.

The whole step S300 includes a process of establishing the relationship between sample library of goblet modeling features and the imagery adjective and a process of optimizing the imagery value which is also a process of optimizing the goblet imagery mapping modeling to obtain the optimal goblet imagery mapping model, so that when the user input a imagery value, a goblet model can be predicted more accurately.

In step S300, a questionnaire survey was conducted on the imagery mapping modeling of goblet, and a relationship data between the user imagery vocabulary and the goblet shape was obtained. The correlation analysis of the relationship model between the user imagery vocabulary and the morphological design variables was carried out. From table 3 and table 4, we can get the average score of 13 goblets on user imagery adjectives and the coordinate values of their respective side elevation feature line. The extraction method used in Table 3 is the principle component analysis. The purpose is to obtain the relationship between user imagery adjectives and morphological design variables. Here, user imagery adjectives are defined as dependent variables and morphological design variables are defined as independent variables. Then these data are imported into SPSS software, and the relationship model between them is obtained through regression analysis.

TABLE 3

Total variance explained

| Component | Initial feature value | | | extractive square and loaded | | |
|---|---|---|---|---|---|---|
| | Total | Variance % | Accumulation % | Total | Variance % | Accumulation % |
| 1 | 2.510 | 62.738 | 62.738 | 2.510 | 62.738 | 62.738 |
| 2 | .884 | 22.109 | 84.847 | | | |
| 3 | .497 | 12.426 | 97.273 | | | |
| 4 | .109 | 2.727 | 100.000 | | | |

TABLE 4

Survey table of external outline of goblet and user imagery vocabulary

| | D1 | D2 | D3 | D4 | D5 |
|---|---|---|---|---|---|
| V1 | 2.57 | 4.42 | 4.88 | 3.65 | 2.9 |
| V2 | 4.86 | 3.59 | 4.52 | 3.83 | 3.58 |
| V3 | 3.18 | 3.55 | 2.52 | 2.51 | 2.23 |
| V4 | 5.57 | 3.70 | 4.51 | 3.86 | 3.29 |
| V5 | 4.16 | 5.59 | 4.50 | 3.75 | 5.03 |
| V6 | 5.25 | 2.16 | 4.86 | 3.38 | 2.84 |
| V7 | 3.47 | 5.55 | 2.79 | 2.68 | 3.69 |
| V8 | 4.76 | 4.16 | 2.88 | 3.57 | 3.68 |
| V9 | 2.64 | 3.69 | 4.92 | 3.43 | 2.63 |
| V10 | 5.32 | 5.10 | 5.08 | 3.71 | 3.64 |
| V11 | 5.38 | 5.23 | 4.92 | 4.42 | 4.92 |
| V12 | 3.13 | 5.14 | 2.96 | 2.72 | 2.55 |
| V13 | 5.26 | 4.42 | 3.06 | 3.49 | 3.94 |

Then the corresponding quantitative coordinates of 18 control variables are obtained, as shown in table 5. The goblet samples are represented by Vi (i=1, 2, 3 . . . )

TABLE 5 shows the quantitative coordinates of the side outline of 13 goblets

| | H1x | H1y | H2x | H2y | H3x | H3y | H4x | H4y | H5x | H5y | H6x | H6y | H7x | H7y | H8x | H8y | H9x | H9y |
|---|---|---|---|---|---|---|---|---|---|---|---|---|---|---|---|---|---|---|
| V1 | 152 | 1000 | 176 | 906 | 223 | 694 | 200 | 516 | 30 | 424 | 11 | 300 | 11 | 72 | 72 | 30 | 210 | 0 |
| V2 | 189 | 1000 | 293 | 931 | 361 | 731 | 288 | 512 | 22 | 403 | 11 | 300 | 11 | 72 | 72 | 30 | 210 | 0 |
| V3 | 83 | 1000 | 90 | 913 | 118 | 660 | 102 | 550 | 15 | 448 | 11 | 300 | 11 | 72 | 72 | 30 | 210 | 0 |
| V4 | 128 | 1000 | 136 | 826 | 169 | 677 | 268 | 607 | 28 | 500 | 11 | 300 | 11 | 72 | 72 | 30 | 210 | 0 |
| V5 | 106 | 1000 | 164 | 883 | 119 | 764 | 71 | 569 | 29 | 397 | 11 | 300 | 11 | 72 | 72 | 30 | 210 | 0 |
| V6 | 178 | 1000 | 209 | 905 | 270 | 714 | 342 | 519 | 188 | 404 | 11 | 300 | 11 | 72 | 72 | 30 | 210 | 0 |
| V7 | 103 | 1000 | 60 | 912 | 92 | 746 | 104 | 523 | 25 | 442 | 11 | 300 | 11 | 72 | 72 | 30 | 210 | 0 |
| V8 | 144 | 1000 | 127 | 926 | 210 | 718 | 212 | 616 | 19 | 431 | 11 | 300 | 11 | 72 | 72 | 30 | 210 | 0 |
| V9 | 180 | 1000 | 135 | 850 | 191 | 654 | 232 | 537 | 174 | 381 | 11 | 300 | 11 | 72 | 72 | 30 | 210 | 0 |
| V10 | 335 | 1000 | 335 | 934 | 418 | 753 | 371 | 617 | 20 | 482 | 11 | 300 | 11 | 72 | 72 | 30 | 210 | 0 |
| V11 | 298 | 1000 | 233 | 911 | 75 | 695 | 14 | 613 | 14 | 454 | 11 | 300 | 11 | 72 | 72 | 30 | 210 | 0 |
| V12 | 128 | 1000 | 110 | 901 | 78 | 712 | 47 | 532 | 30 | 444 | 11 | 300 | 11 | 72 | 72 | 30 | 210 | 0 |
| V13 | 281 | 1000 | 241 | 856 | 195 | 707 | 148 | 543 | 31 | 499 | 11 | 300 | 11 | 72 | 72 | 30 | 210 | 0 |

In step S320, find a mode of the values that scored by user imagery vocabulary. The following is the experimental process:

TABLE 6 summary table of modes of the values that scored by user imagery vocabulary

| | D1 | D2 | D3 | D4 | D5 |
|---|---|---|---|---|---|
| V1 | 2 | 5 | 6 | 2 | 2 |
| V2 | 6 | 5 | 5 | 5 | 3 |
| V3 | 2 | 2 | 2 | 2 | 1 |
| V4 | 6 | 2 | 5 | 4 | 3 |
| V5 | 4 | 6 | 5 | 4 | 6 |
| V6 | 6 | 1 | 5 | 4 | 3 |
| V7 | 3 | 6 | 2 | 2 | 3 |
| V8 | 6 | 5 | 2 | 3 | 4 |
| V9 | 1 | 5 | 6 | 3 | 2 |
| V10 | 7 | 7 | 4 | 4 | 4 |
| V11 | 7 | 6 | 5 | 5 | 6 |
| V12 | 1 | 6 | 2 | 2 | 1 |
| V13 | 6 | 4 | 2 | 3 | 4 |

Figure 3:
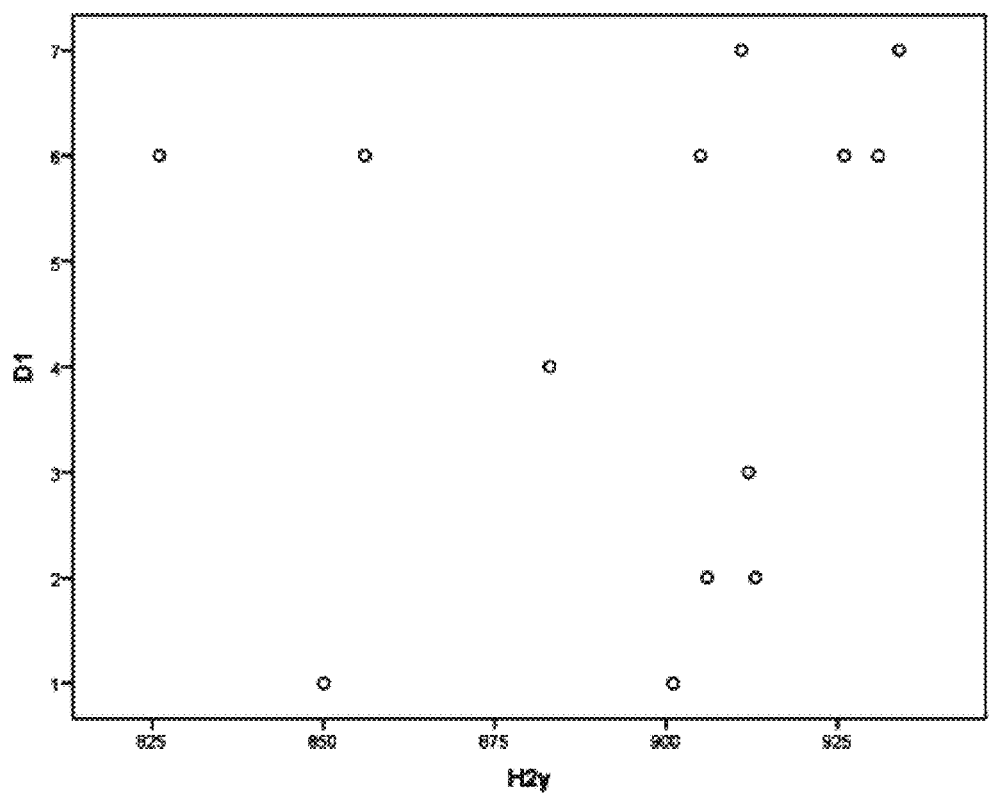
FIG. 3 is a scatter plot of the correlation between the "compact" and a morphological design variable H1x.
Figure 4:
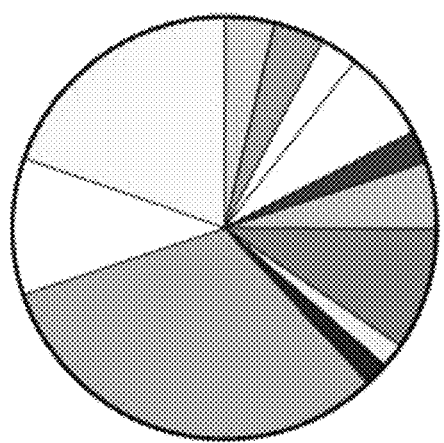
FIG. 4 is a schematic diagram of roulette selection.

Data were put into SPSS for regression analysis, and the results were as follows: 1. D1 "compact" as an example, the scatter diagram of correlation between imagery term D1 and morphological variable H2x was obtained, as shown in FIG. 3. It can be seen that the linearity is not obvious.

In the optimization process, the algorithm input adopted is:

The input to the genetic algorithm of this embodiment is five pairs of imagery words of "−3" to "3", representing compact, public, tough, modern and simple, respectively. The range of imagery values is "−3" to"3". For example, in the first imagery word, "3" mean not compact and"−3" means very compact. The goal of the algorithm is to generate the shape of the goblet according to the imagery value input by the user.

Introduction to the genetic algorithm adopted in this embodiment:

The genetic algorithm of this embodiment adopted 13 seeds, all of which were typical representatives from the goblet, and the imagery values of these goblets were obtained through a user questionnaire survey.

The genetic algorithm starts with the 13 seeds and encodes them first. This algorithm adopts two kinds of encoding methods, one is binary encoding, and the other is gray code encoding. Genetic operation is carried out through the following processing process:

Gene Crossover Algorithm

According to the crossing rate parameter, two seeds were randomly selected from the seeds, and a gene location was randomly selected. The two genes were cross-processed, and then put back into the seed pool.

Genetic Mutation Algorithm

After traverse the entire seed pool, select seeds from the seed pool according to the mutation rate parameter, and then randomly select the mutation position in the gene of the seed, and perform mutation operations on the genes at that position, such as "0" becomes "1", "1" becomes "0".

Select Operation Algorithm

Operation adopted roulette selection algorithm, using genetic crossover and mutation, the fitness of seed will change, need through the selection algorithm, kept the seeds of those high fitness, roulette wheel selection algorithm, firstly calculates the fitness value, transform the fitness value all to make sure all the fitness value greater than 0, thus, then a normalized process of fitness value is performed, transform the fitness value into a probability, calculate the cumulative probability.

Each gene in the population specifies a small block in the pie chart. The size of the block is proportional to the fitness score of the gene. The higher the fitness score, the larger the area it corresponds to in the pie chart. To pick a gene, all you have to do is rotate the wheel until the wheel stops, see where the pointer stops, and pick the gene that corresponds to it. A set of random numbers from 0 to 1, the same as the number of genes in the seed, is generated, and a roulette wheel is played. The genes with the largest proportion on the disk are most likely to be selected. This is the principle of roulette selection, through the operation of the above steps, I calculate the fitness function value, select the best seed to save, then skip to step 1 to continue the steps of the circular genetic algorithm. When the number of cycles reaches the specified number, the cycle is stopped, and the globally optimal seed is selected from the optimal seed selected each time as the result of the algorithm.

As the termination condition of the genetic algorithm, the fitness function uses the following methods:

The shape similarity was used as the weight, multiplied by the imagery values of the original 13 seeds, and the weights were added to obtain the final imagery values. This fitness function has a large constraint on the generated shape, and is not easy to produce a large variation, but has a high degree of control.

After the optimization process, the final imagery value is obtained, and then the optimal imagery mapping modeling model of goblet is obtained. When the user inputs the imagery value, the shape of the goblet satisfying the imagery value index can be generated through the optimal imagery mapping modeling model.

Embodiment Two

Figure 2:
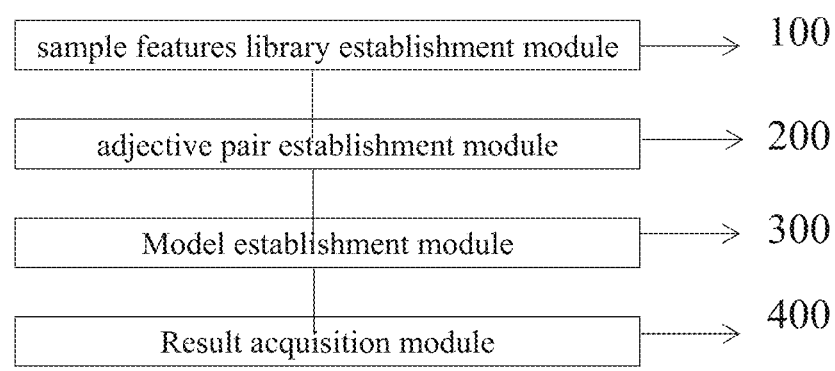
FIG. 2 is a schematic diagram of an overall device structure of the present invention.

A system for generating imagery mapping modeling of goblet includes a sample features library establishment module 100, an adjective pair establishment module 200, a model establishment module 300 and a result acquisition module 400, as shown in FIG. 2.

The sample features library establishment module 100 for all the collected goblets pre-process the collected goblets and establish a sample library of goblet modeling features based on a height of the goblets.

The adjective pair establishment module 200 is used to perform dimension reduction processing on the imagery vocabulary based on the collected goblet imagery vocabulary, and to establish the goblet user imagery adjective pair based on the processing result;

The model establishment module 300 is used to obtain a relationship between the goblet modeling and imagery adjective through the sample library of goblet modeling features and the goblet user imagery adjective pair, and an optimal imagery value is established. The imagery mapping modeling model corresponding to the optimal imagery value is an optimal goblet imagery mapping modeling model.

The result acquisition module 400 is configured to input a user-entered imagery value into to the established optimal goblet imagery mapping modeling model, and produces a goblet shape meets an index.

Further, the sample features library establishment module 100 is configured as follows:

select typical samples from the collected goblets;

a uniformity of the goblet height is performed on all the selected typical samples to obtain goblet samples of uniform height;

extract an outline of the goblet samples of the uniform height to obtain an outline curve of a side of the goblet;

the outline curve of the side of the goblet is modeled and coded, and the Bezier curve is used to perform a drawing point expression process of the outline curve of the side of each goblet to obtain a drawing point coordinate of the side outline of the goblet;

according to the drawing point coordinate of the side outline of the goblet, the coordinate value variable of the outline curve of the side of the goblet is obtained, and then the sample library of goblet modeling features of the goblet is obtained.

In addition, the sample features library establishment module 100 is configured as follows:

draw the outline of the goblet into the Bezier curve, and leave a goblet stem width and base untreated;

draw several coordinate points on the Bezier curve, and plot these several coordinate points to obtain the outline curve of the side of the goblet.

More specifically, the adjective pair establishment module 200 is set as:

collect all the words about an imagery of the goblet to form an imagery vocabulary;

perform dimension reduction processing on the imagery vocabulary to obtain the goblet user imagery adjective pair.

In addition, the model establishment module 300 is configured as:

take a typical sample seed in the sample library of goblet modeling features as an initial value, and perform binary coding on the coordinate value of the outline curve of the side of the typical sample seed;

obtain a user's score on the imagery adjective of the goblet, and obtain a relationship between the sample library of goblet modeling features and the imagery adjective;

based on a crossing rate parameter of a genetic algorithm, two seeds are selected from the sample library of goblet modeling features, and a gene position was randomly selected for cross-genetic generation of candidate seeds for treatment. Candidate seeds after treating are put back into a seed pool, namely the sample library of goblet modeling features;

traverse the entire seed pool, select a corresponding seed according to a mutation rate parameter, randomly select a mutation position based a gene of the corresponding seed, and perform mutation operation processing on the gene at the mutation position;

obtain a Euclidean distance between each candidate seed from the typical sample seed, and convert the Euclidean distance into a weight value;

calculate the imagery value of the current seed in the seed pool and compare the imagery value with the imagery value of the typical sample seed to obtain a fitness of the seed. Select a maximum fitness value and save a most suitable seed to obtain a most suitable seed per generation, and use a seed with the highest fitness value as the final solution;

the imagery values of all the seeds in the seed pool were multiplied and the weight values were added to obtain a final imagery value, resulting in the optimal imagery mapping modeling of goblet.

The system of the present invention also proposes a method for generating a computer-aided solution for a curved shape product such as a goblet, and generates a goblet shape that satisfies each of the imagery value indexes according to the imagery value input by the user. Established a mapping relationship between goblet product shapes and imagery adjectives, fulfilling user's needs for goblet imagery shapes. Combining genetic algorithms, computer programming technology provides fast and effective new ideas for the update and iteration of goblet styling schemes, provides effective methods for product innovation, and provides constructive guidance for enterprises to develop goblet styling designs.

For the device embodiments, as they are basically similar to the method embodiments, the description is relatively simple. For the relevant points, please refer to the part of the method embodiments.

Those skilled in the art should understand that the embodiments of the present invention may be provided as a method, an apparatus, or a computer program product. Therefore, the present invention may take the form of an entirely hardware embodiment, an entirely software embodiment, or an embodiment combining software and hardware aspects. Moreover, the present invention may take the form of a computer program product implemented on one or more computer-usable storage media (including, but not limited to, disk storage, CD-ROM, optical storage, etc.) containing computer-usable program code.

The present invention is described with reference to flowcharts and/or block diagrams of the method, terminal device (system), and computer program product according to the present invention. It should be understood that each process and/or block in the flowcharts and/or block diagrams, and combinations of processes and/or blocks in the flowcharts and/or block diagrams can be implemented by computer program instructions. These computer program instructions may be provided to a processor of a general purpose computer, special purpose computer, embedded processor, or other programmable data processing terminal device to produce a machine, such that the instructions executed by the processor of the computer or other programmable data processing terminal device Means are generated for implementing the functions specified in one or more flowcharts and/or one or more blocks of the block diagrams.

It should be noted:

"One embodiment" or "an embodiment" mentioned in the specification means that a particular feature, structure, or characteristic described in connection with the embodiment is included in at least one embodiment of the present invention. Therefore, the phrases "one embodiment" or "an embodiment" appearing in various places throughout the specification do not necessarily refer to the same embodiment.

Although the preferred embodiments of the present invention have been described, those skilled in the art can make other changes and modifications to these embodiments once they know the basic inventive concepts. Therefore, the following claims are intended to be construed to include the preferred embodiments and all changes and modifications that fall within the scope of the invention.

In addition, it should be noted that the specific embodiments described in this specification may have different components, shapes, and names. All equivalent or simple changes made according to the structure, features, and principles described in the patent concept of the present invention are included in the protection scope of the patent of the present invention. Those skilled in the art to which the present invention pertains may make various modifications or additions to or replace the described specific embodiments in a similar manner, as long as it does not deviate from the structure of the present invention or exceed the scope defined by the claims, all belong to the protection scope of the present invention.

What is claimed is:

1. A method for generating imagery mapping modeling of a goblet, comprising the following steps:
    based on set of collected goblets, pre-processing the collected goblets based on a height of each goblet, and establishing a sample library of goblet modeling features;
    obtaining a collected goblet imagery vocabulary comprising pairs of adjectives that describe the pre-processed collected goblets;
    performing dimension reduction processing on the collected goblet imagery vocabulary, and establishing goblet user imagery adjective pairs based on the dimension reduction processing result;
    obtaining a relationship between the goblet modeling features and goblet user imagery adjective pairs using the sample library of goblet modeling features and the goblet user imagery adjective pairs, and establishing an optimal imagery value, wherein an imagery mapping model that corresponds to the optimal imagery value is established as an optimal goblet imagery mapping model;
    inputting a user-entered imagery value into the established optimal goblet imagery mapping model, and producing a goblet shape that meets an imagery value index;
    wherein the pre-processing of the collected goblets based on the height of each goblet, and the establishing the sample library of the goblet modeling features further comprises:

selecting typical samples from the collected goblets;
performing a uniformity of the goblet height on all the selected typical samples to obtain goblet samples of uniform height;
extracting an outline of the goblet samples of the uniform height to obtain an outline curve of a side of each goblet;
modeling and coding an outline curve of the side of each goblet using a Bezier curve to obtain a drawing point coordinate of the outline curve of the side of each goblet; and
obtaining a coordinate value variable of the outline curve of the side of each goblet according to the drawing point coordinate, and then the sample library of goblet modeling features of the goblet is obtained.

2. The method for generating imagery mapping of a goblet according to claim 1, wherein the performing the uniformity of the goblet height further comprises:
drawing the outline of each goblet sample into the Bezier curve, and leaving a goblet stem width and base untreated;
drawing several coordinate points on the Bezier curve, and plotting these several coordinate points to obtain the outline curve of the side of each goblet.

3. The method for generating imagery mapping of a goblet according to claim 1, wherein the performing dimension reduction processing on the collected goblet imagery vocabulary, and the establishing goblet user imagery adjective pairs further comprises:
collecting all the words about an imagery of each goblet to form the collected goblet imagery vocabulary; and
performing dimension reduction processing on the collected goblet imagery vocabulary to obtain the goblet user imagery adjective pairs.

4. The method for generating imagery mapping of a goblet according to claim 1, wherein the obtaining the relationship between the goblet modeling features and goblet user imagery adjective pairs, and the establishing the optimal imagery value further comprises:
taking a typical sample seed in the sample library of goblet modeling features as an initial value, and performing binary coding on a coordinate value variable of an outline curve of the side of the typical sample seed;
obtaining a user's score on an imagery adjective of the goblet, and obtaining a relationship between the sample library of goblet modeling features and the imagery adjective;
based on a crossing rate parameter of a genetic algorithm, selecting two seeds from the sample library of goblet modeling features, and randomly selecting a gene position for cross-genetic generation of candidate seeds for treatment, wherein candidate seeds after treating are put back into the sample library of goblet modeling features, which is a seed pool;
traversing the entire seed pool, selecting a corresponding seed according to a mutation rate parameter, randomly selecting a mutation position based on a gene of the corresponding seed, and performing mutation operation processing on the gene at the mutation position;
obtaining a Euclidean distance between each candidate seed from the typical sample seed, and convert the Euclidean distance into a weight value;
calculating the imagery value of the current seed in the seed pool and compare the imagery value with the imagery value of the typical sample seed to obtain a fitness of the seed, selecting a maximum fitness value and saving a most suitable seed to obtain a most suitable seed per generation, and using a seed with the highest fitness value as a final solution; and
multiplying imagery values of all the seeds in the seed pool and adding the weight values to obtain a final imagery value, resulting in the optimal goblet imagery mapping model.

5. A system for generating imagery mapping of a goblet, comprising a sample features library establishment module, an adjective pair establishment module, a model establishment module and a result acquisition module;
wherein the sample features library establishment module is used to pre-process a set of collected goblets and establish a sample library of goblet modeling features based on a height of the goblets;
the adjective pair establishment module is used to obtain a collected goblet imagery vocabulary comprising pairs of adjectives that describe the pre-processed collected goblets, to perform dimension reduction processing on the collected goblet imagery vocabulary, and to establish goblet user imagery adjective pairs based on the dimension reduction processing result;
the model establishment module is used to obtain a relationship between the goblet modeling features and imagery adjective pairs using the sample library of goblet modeling features and the goblet user imagery adjective pairs, and to establish an optimal imagery value;
wherein an imagery mapping model that corresponds to the optimal imagery value is established as an optimal goblet imagery mapping model; and
the result acquisition module is configured to input a user-entered imagery value into the established optimal goblet imagery mapping model, and produce a goblet shape that meets an imagery value index;
wherein the sample features library establishment module is further configured to:
select typical samples from the collected goblets;
perform a uniformity of the goblet height on all the selected typical samples to obtain goblet samples of uniform height;
extract an outline of the goblet samples of the uniform height to obtain an outline curve of a side of each goblet;
model and code an outline curve of the side of each goblet using a Bezier curve to obtain a drawing point coordinate of the outline curve of the side of each goblet; and
obtain a coordinate value variable of the outline curve of the side of each goblet according to the drawing point coordinate, and then the sample library of goblet modeling features of the goblet is obtained.

6. The system for generating imagery mapping of a goblet according to claim 5, wherein the sample features library establishment module is further configured to:
draw the outline of each goblet into the Bezier curve, and leave a goblet stem width and base untreated;
draw several coordinate points on the Bezier curve, and plot these several coordinate points to obtain the outline curve of the side of each goblet.

7. The system for generating imagery mapping of a goblet according to claim 5, wherein the adjective pair establishment module is further configured to:
collect all the words about an imagery of each goblet to form the collected goblet imagery vocabulary; and
perform dimension reduction processing on the collected goblet imagery vocabulary to obtain the goblet user imagery adjective pairs.

8. The system for generating imagery mapping of a goblet according to claim 5, wherein the model establishment module is further configured to:
- take a typical sample seed in the sample library of goblet modeling features as an initial value, and perform binary coding on a coordinate value variable of an outline curve of the side of the typical sample seed;
- obtain a user's score on an imagery adjective of the goblet, and obtain a relationship between the sample library of goblet modeling features and the imagery adjective;
- based on a crossing rate parameter of a genetic algorithm, select two seeds from the sample library of goblet modeling features, and randomly select a gene position for cross-genetic generation of candidate seeds for treatment, wherein candidate seeds after treating are put back into the sample library of goblet modeling features, which is a seed pool;
- traverse the entire seed pool, select a corresponding seed according to a mutation rate parameter, randomly select a mutation position based a gene of the corresponding seed, and perform mutation operation processing on the gene at the mutation position;
- obtain a Euclidean distance between each candidate seed from the typical sample seed, and convert the Euclidean distance into a weight value;
- calculate the imagery value of the current seed in the seed pool and compare the imagery value with the imagery value of the typical sample seed to obtain a fitness of the seed; select a maximum fitness value and save a most suitable seed to obtain a most suitable seed per generation, and use a seed with the highest fitness value as a final solution; and
- multiply imagery values of all the seeds in the seed pool and add the weight values to obtain a final imagery value, resulting in the optimal goblet imagery mapping model.

9. A method for generating imagery mapping of a goblet, comprising the following steps:
- based on a set of collected goblets, pre-processing the collected goblets based on a height of each goblet, and establishing a sample library of goblet modeling features;
- obtaining a collected goblet imagery vocabulary comprising pairs of adjectives that describe the pre-processed collected goblets;
- performing dimension reduction processing on the collected goblet imagery vocabulary, and establishing goblet user imagery adjective pairs based on the dimension reduction processing result;
- obtaining a relationship between the goblet modeling features and goblet user imagery adjective pairs using the sample library of goblet modeling features and the goblet user imagery adjective pairs, and establishing an optimal imagery value, wherein an imagery mapping model that corresponds to the optimal imagery value is established as an optimal goblet imagery mapping model;
- inputting a user-entered imagery value into the established optimal goblet imagery mapping model, and producing a goblet shape that meets an imagery value index;
- wherein the obtaining the relationship between the goblet modeling features and goblet user imagery adjective pairs, and the establishing the optimal imagery value further comprises:
- taking a typical sample seed in the sample library of goblet modeling features as an initial value, and performing binary coding on a coordinate value variable of an outline curve of a side of the typical sample seed;
- obtaining a user's score on an imagery adjective of the goblet, and obtaining a relationship between the sample library of goblet modeling features and the imagery adjective;
- based on a crossing rate parameter of a genetic algorithm, selecting two seeds from the sample library of goblet modeling features, and randomly selecting a gene position for cross-genetic generation of candidate seeds for treatment, wherein candidate seeds after treating are put back into the sample library of goblet modeling features, which is a seed pool;
- traversing the entire seed pool, selecting a corresponding seed according to a mutation rate parameter, randomly selecting a mutation position based on a gene of the corresponding seed, and performing mutation operation processing on the gene at the mutation position;
- obtaining a Euclidean distance between each candidate seed from the typical sample seed, and convert the Euclidean distance into a weight value;
- calculating the imagery value of the current seed in the seed pool and compare the imagery value with the imagery value of the typical sample seed to obtain a fitness of the seed, selecting a maximum fitness value and saving a most suitable seed to obtain a most suitable seed per generation, and using a seed with the highest fitness value as a final solution; and
- multiplying imagery values of all the seeds in the seed pool and adding the weight values to obtain a final imagery value, resulting in the optimal goblet imagery mapping model.

* * * * *